(12) United States Patent
Segal et al.

(10) Patent No.: US 8,463,430 B2
(45) Date of Patent: *Jun. 11, 2013

(54) INTERACTIVE AND 3-D MULTI-SENOR TOUCH SELECTION INTERFACE FOR AN AUTOMATED RETAIL STORE, VENDING MACHINE, DIGITAL SIGN, OR RETAIL DISPLAY

(75) Inventors: Mara Clair Segal, San Francisco, CA (US); Darrell Scott Mockus, San Francisco, CA (US); Russell Jon Greenberg, New York, NY (US)

(73) Assignees: Utique, Inc, San Francisco, CA (US); Darrell S. Mockus, San Francisco, CA (US); Russell Greenberg, New York, NY (US)

( * ) Notice: Subject to any disclaimer, the term of this patent is extended or adjusted under 35 U.S.C. 154(b) by 821 days.

This patent is subject to a terminal disclaimer.

(21) Appl. No.: 12/589,277

(22) Filed: Oct. 21, 2009

(65) Prior Publication Data

US 2010/0103131 A1    Apr. 29, 2010

Related U.S. Application Data

(60) Provisional application No. 61/107,829, filed on Oct. 23, 2008.

(51) Int. Cl.
*G06F 17/00*    (2006.01)
(52) U.S. Cl.
USPC .............. 700/232; 700/242; 700/244; 221/8
(58) Field of Classification Search
USPC .................. 700/232, 234, 242, 244; 221/4, 5, 221/8
See application file for complete search history.

(56) References Cited

U.S. PATENT DOCUMENTS

| | | | | |
|---|---|---|---|---|
| 5,831,862 | A * | 11/1998 | Hetrick et al. | 700/232 |
| 5,904,257 | A * | 5/1999 | Marmet et al. | 211/75 |
| 6,193,154 | B1 | 2/2001 | Phillips et al. | |
| 6,412,654 | B1 * | 7/2002 | Cleeve | 221/7 |
| 7,143,065 | B1 | 11/2006 | Enright | |
| 7,195,157 | B2 | 3/2007 | Swartz et al. | |
| 7,383,099 | B2 * | 6/2008 | Pollard et al. | 700/232 |
| 7,912,581 | B2 | 3/2011 | Walker et al. | |
| 7,950,817 | B2 * | 5/2011 | Zulim et al. | 362/125 |
| 8,068,933 | B2 | 11/2011 | Walker et al. | |
| 8,082,061 | B2 * | 12/2011 | Segal et al. | 700/232 |
| 8,126,812 | B1 | 2/2012 | Peterson et al. | |

(Continued)

OTHER PUBLICATIONS

U.S. Appl. No. 12/804,418, Office Action, Apr. 6,2012.

*Primary Examiner* — Michael K Collins
(74) *Attorney, Agent, or Firm* — One LLP; Kenneth S. Roberts

(57) ABSTRACT

Vending machines, automated retail stores, and retail displays with a computer controlled, activation system that senses either the gesture of a customer proximate product display tubes or a touch-screen selection on a computer screen. Item-based lighting produces variable visual effects in conjunction with actual or potential vends to provide an enhanced vending experience. Offered products are stored within display tubes that are arranged in orderly geometric arrays. RGB lighting through a plurality of LED banks associated with each display tube are controlled by the activation system Combinations of differently colored LED's are computer controlled on a per product basis to artistically illuminate available products and assist customers. Pre-programmed lighting sequences can switch LEDs off and on, vary their intensity, and alter resultant colors.

18 Claims, 11 Drawing Sheets

U.S. PATENT DOCUMENTS

| | | |
|---|---|---|
| 8,170,713 B2 * | 5/2012 | Levasseur et al. ............ 700/232 |
| 2004/0249711 A1 | 12/2004 | Walker et al. |
| 2005/0040230 A1 | 2/2005 | Swartz et al. |
| 2005/0211768 A1 | 9/2005 | Stillman |
| 2005/0234590 A1 * | 10/2005 | Sato et al. .................... 700/231 |
| 2006/0253347 A1 | 11/2006 | Walker et al. |
| 2007/0294135 A1 | 12/2007 | Zieger |
| 2008/0040211 A1 | 2/2008 | Walker et al. |
| 2009/0144624 A1 | 6/2009 | Barnes, Jr. |
| 2009/0312866 A1 * | 12/2009 | Kim et al. .................... 700/231 |
| 2010/0100236 A1 | 4/2010 | Segal et al. |
| 2010/0138037 A1 | 6/2010 | Adelberg et al. |
| 2010/0262282 A1 | 10/2010 | Segal et al. |
| 2012/0029691 A1 | 2/2012 | Mockus et al. |

* cited by examiner

INTERACTIVE AND 3-D MULTI-SENOR TOUCH SELECTION INTERFACE FOR AN AUTOMATED RETAIL STORE, VENDING MACHINE, DIGITAL SIGN, OR RETAIL DISPLAY

CROSS-REFERENCE TO RELATED APPLICATION

This application is based upon U.S. Provisional Application Ser. No. 61/107,829, filed Oct. 23, 2008, and entitled "Interactive and 3-D Multi-Sensor Touch Selection Interface for an Automated Retail Store, Vending Machine, Digital Sign, or Retail Display", by inventors Mara Segal, Darrell Mockus, and Russell Greenberg, and priority based on said application is claimed.

BACKGROUND OF THE INVENTION

1. Field of the Invention

The present invention relates generally to automated, computer-operated vending machines. More particularly, the present invention relates to interactive vending machines with enhanced two-dimensional and/or three dimensional user interfaces that respond to user gestures or presence or touch for vending products.

2. Description of the Related Art

Numerous prior art vending machines exist for selling or vending diverse products through an automated, or 'self-service' format. Vending reached popularity in the late 1800's with coin-operated devices dispensing diverse merchandise. More recently vending machines have evolved to include robotic dispensing components, and/or PCs and virtual interfaces. These new vending platforms have emerged in the marketplace under the popular descriptions "automated retail," "interactive retail," and/or "interactive retail displays." Such vending machines may be deployed within a variety of retail or commercial settings. They typically include illuminated, visual displays that seek to attract and educate customers or potential customers. Products information may be customer-requested utilizing interactive displays, including touch screen computer interfaces and virtual interfaces. However, a disadvantage of known machines relates to their cumbersome and "mechanical" appearance.

Automated retail stores, vending machines, and/or retail display platforms still look and feel like large, unfriendly machines or "mechanical boxes." Such machines provide potential customers with a cold, impersonal and indifferent impression, which is not conducive to maximizing sales. Such prior art vending machines lack the sophistication of traditional retail stores in both the end user and retail display experience. This is due to the standard lighting, interfaces, and display mechanisms within these platforms. Displays are limited in the amount of information that can be communicated about a product and space constraints. Further, they fail to provide the depth of information found in many e-commerce portals. Additionally, information on products within traditional automated retail/vending platforms has historically been limited to either the virtual touch screen or the physical display and there is no perceptual link between touch screen information and products being displayed beyond digital images on the touch screen.

Typically, the presentation of merchandise and information offered by traditional vending machines has not evolved sufficiently to satisfy a discerning consumer of premium or upscale products. The lack of a premium design or appearance has proven to be a hurdle for the distribution of expensive luxury items in automated vending machines. Historically product selection methods in vending, automated retail, or retail displays have included crude mechanical systems such as levers, buttons, and pull posts. More recently, selection have been enabled through touch screens which display virtual pictures of merchandise. Each of these methods requires the user to draw a connection between the disparate areas where a physical product is stored vs. a panel where it is selected.

Known vending, automated retail, retail display, and digital signage platforms lack the ability to directly interface with a physical product to select that product or reveal additional information without having to leverage a virtual representation of the product. The repercussion of this is that there is increased human error in product selection, less intuitive selecting, and inefficiency in purchasing.

It is thus desirable for an ideal, upscale user interface for vending machines or the like enabling such machines to interactively respond to and sense diverse user inputs to increase user-friendliness, engagement and ease of use. Further, it is desirable to provide an enhanced vending experience or ambience in conjunction with the vending of upscale products.

BRIEF SUMMARY OF THE INVENTION

This invention provides an enhanced, customer interactive vending machine ideal for physical products for use within an automated retail store or commercial environment. Importantly, the instant vending machine utilizes enhanced customer-responsive sensing apparatus to better interact with the customer. A scanned region is monitored to detect customer presence and gestures. Diverse sensor inputs including motion sensors, pressure profile sensors, and product sensors associated with multiple product display tubes respond to the user-touch of product display regions and/or user presence or motion.

This invention uses a combination of motion and pressure based sensors, lighting and visual displays to give the user a rich interactive experience currently not available in automated retail, vending machines, digital signage, or retail display. This invention enables (multiple) product selection and education to occur with ease and expediency; similar to grabbing a product off of a display or shelf, the user can simply reach their hand out towards the product to make the selection, simulating natural gestures found in traditional retail environments.

The preferred sensor arrangement allows a user to seamlessly select a product by physically touching a display 'unit' on the frontal plane of the console. Through this 'touch selection' adaptation, the chosen product becomes highlighted when touched to indicate that a product has been selected or interfaced with. In other words, users may directly touch the display area in front of the product to select that item. Touching the display can also perform other actions, including the retrieval of additional product information and product recommendations.

The preferred multi-touch user interface comprises façade, or frontal screen for displaying products, and a corresponding touch screen display. The interactive multi-touch interface can receive user input through motions sensors that detect the corporeal proximity and location of users in a set area near the machine, through user interaction with a touch activated LCD screen, and allowing users to "select" products by touching the area in front of the product/merchandise. Each of these user inputs can have numerous lighting events (sequence of lights changing color, intensity, or switching from on/off)

associated with it to occur. The touch screen display shows information about the selected merchandise and provides the users with additional options to view and purchase the product. Lighting accompanies user interactions indicating selections, and audio queues also accompany user input. Brightening and dimming of lights can dynamically indicate the physical presence of a user.

The display area preferably comprises sensors, such as motion sensors and pressure point sensors, that are programmed with X and Y coordinates to determine the location and interaction of a user and ensure a dynamic response from the display area (the user's gesture breaks a plane triggering a response). These sensors are linked to a computer that receives input and controls the various peripherals of the machine. Peripherals include a lighting system that functions with increasing intensity (lumens) of light and hues of light depending on user behavior and system commands, and an audio system that can respond and reacts to user input and system commands. A touch display screen shows additional information and offers additional options about the items selected by the user. The user can select items from either the display façade or from the touch screen display.

The enhanced responsiveness and service levels within the automated retail/vending platform/retail display platform to better support a relatively more expensive/discretionary product or service and meets the desires of the end user of this merchandise, or the businesses working to promote this merchandise.

In addition to the above described customer interfaces, the best mode of the invention uses multiple arrays of RGB LEDs that are computer controlled to adjust the quality, intensity, and color of light/per product basis through placement and software programming. The preferred lighting system works on an individual product basis to both enhance the lighting on a product and facilitate user interaction. This invention also uses a virtual network by which software that controls the LED controllers and lighting experience can be updated remotely without visiting the individual store or changing the bulbs and fixtures. The invention includes programmable LED lighting, sensors that detect motion through touch and human gesture, and software that integrates the functionality of these components that can be updated through a remote/virtual network.

The lighting system facilitates choreography of light events to user presence and responds to user inputs to guide the user through selections and transactions. It also performs 'passive' lighting events in a "display and attract." Lights may be switched on or off through varying sequences, light intensity and directionality may be varied, and assorted color combinations may be displayed to engage passerby's. This lighting system can be integrated with audio systems and additional display components through software.

The enhanced functionality, flexibility, and control of the preferred lighting system allows for superior merchandising, efficiency and ease of the user experience, greater energy efficiency, and cost savings in terms of labor to replace lighting that does not have efficiency of LEDs. In addition, the LED system can be adjusted to harmonize with the ambient light quality of the room. In a dimmer environment, like in a hotel lobby or spa, the base level of brightness to the machine will be set lower than if the machine is placed in a very well lit environment, such as a department store. In conclusion, as far as we are aware, no lighting system of flexible LEDs and integration of LEDS onto a virtual network within an automated retail store, vending machine, or retail display exists for ease of customization, configuration, intuitive interfacing, utilization and low-cost of maintenance of this system.

Thus a basic object of our invention is to provide an intuitive and efficient vending selection apparatus.

A related object is to provide an interactive touch-activated product display for a user-friendly information providing display. Users can select the area in front of a product and receive related information via a display such as an LCD screen.

Another basic object is to provide an entertaining method of selecting a product, or multiple products, within an automated vending machine, or retail display.

A related object is to provide a visually pleasing mode of interacting with a vending machine, automated retail store, retail display, or the like.

Another important object is to provide an interactive retail display in the form of a vending machine that uses sensors embedded in the product display for detecting a user presence and commands.

Other objects are as follows:

a) to provide a method for guiding the selection of a product with a user's hand or body motion.

b) to provide a simpler and more efficient method of selecting a product, or multiple products in an automated store, vending machine, or interactive retail display.

c) to provide a method of detecting the presence of a passerby, or user, in an automated store, vending machine, or interactive retail display platform without requiring the user to deliberately engage with the platform.

d) to provide a method of simulating a traditional retail shopping experience using a machine.

e) to recognize user input in three dimensions (without requiring a user to physically touch a display) in an automated store, vending machine, or interactive retail display.

f) to monitor and use human gestures and interaction to engage an individual and market a product or service in an automated store, vending machine, or interactive retail display—'Touch Selection.' g) to feature products using interactive lighting and corresponding information as driven by user inputs to a display or surface.

h) to provide infrastructure to house physical products in an architectural display configuration that interfaces with a digital display/touch screen.

i) to trigger promotional events in a vending platform or retail display to attract the attention of passerby's.

j) to provide methods to make an automated retail store, vending machine, or retail display more educational and responsive to customer inputs.

k) to provide methods to make an automated retail store, vending machine, or retail display feel less mechanized and more interactive and/or responsive to a user.

l) to provide a method for choreographing lighting and sound to respond to user inputs and human gestures in a vending machine, automated retail platform, or retail display.

m) to provide methods to make an automated retail store, vending machine, or retail display more intuitive through use of a sensor-activated user interface.

n) to monitor and use human gestures and interaction to determine and predict interests to market, up sell, and cross sell to that individual.

o) to provide a method of interacting with an automated retail store accessible to people with various disabilities.

p) to provide users the ability to preview a product/merchandise selection through mechanical selection and physical presentation of a product before purchase.

q) to enhance the presentation of merchandise within an automated retail store, vending machine, or retail display.

r) to indicate to users the ability to access information on a product by touching the product display encasing the physical product (the area immediately surrounding the product)

s) to provide a method and interface for product selection on a vending/automated retail store that enables the customer to touch the surface directly in front of a product rather than utilizing a common LCD or CRT screen interface that only provides a description or artificial representation of a physical product to make their selection.

t) to enable selection of an item in a vending machine or physical product display by touching a transparent surface immediately in front of the item detecting the motion of a user reaching for an item.

u) to facilitate user interactions with the automated vending process or retail display by guiding product selections with sensors.

v) to provide a method for automated/vending stores to respond to the consumer in comparable ways to a human store clerk (a method to 'humanize' the machine).

w) to provide a method to increase interactivity of a vending platform by integrating lighting with the ability to select products or items by touching a touch sensitive area in front of a physical product or representation of a product.

x) to provide methods to make a retail display more educational and responsive to customer inputs through the integration of lighting and touch detection.

y) to provide methods to make a vending or automated retail experience feel less mechanized and more interactive and responsive to a user.

z) to provide a solution for concealing empty inventory shelves within a vending or automated retail platform.

These and other objects and advantages of our invention will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
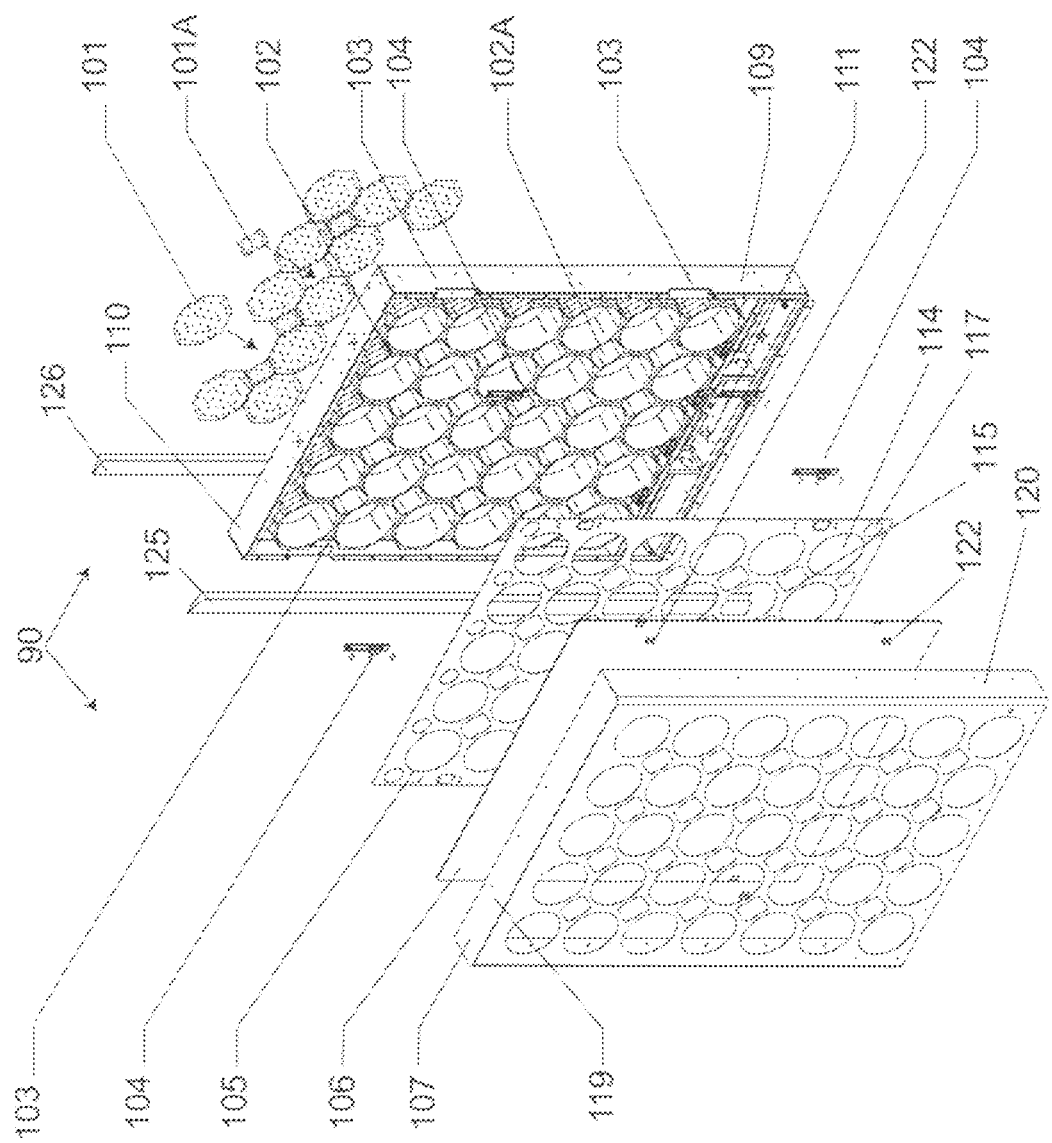
FIG. 1 is an exploded, isometric assembly view of a preferred display module assembly used with the vending machines of the invention.
Figure 2:
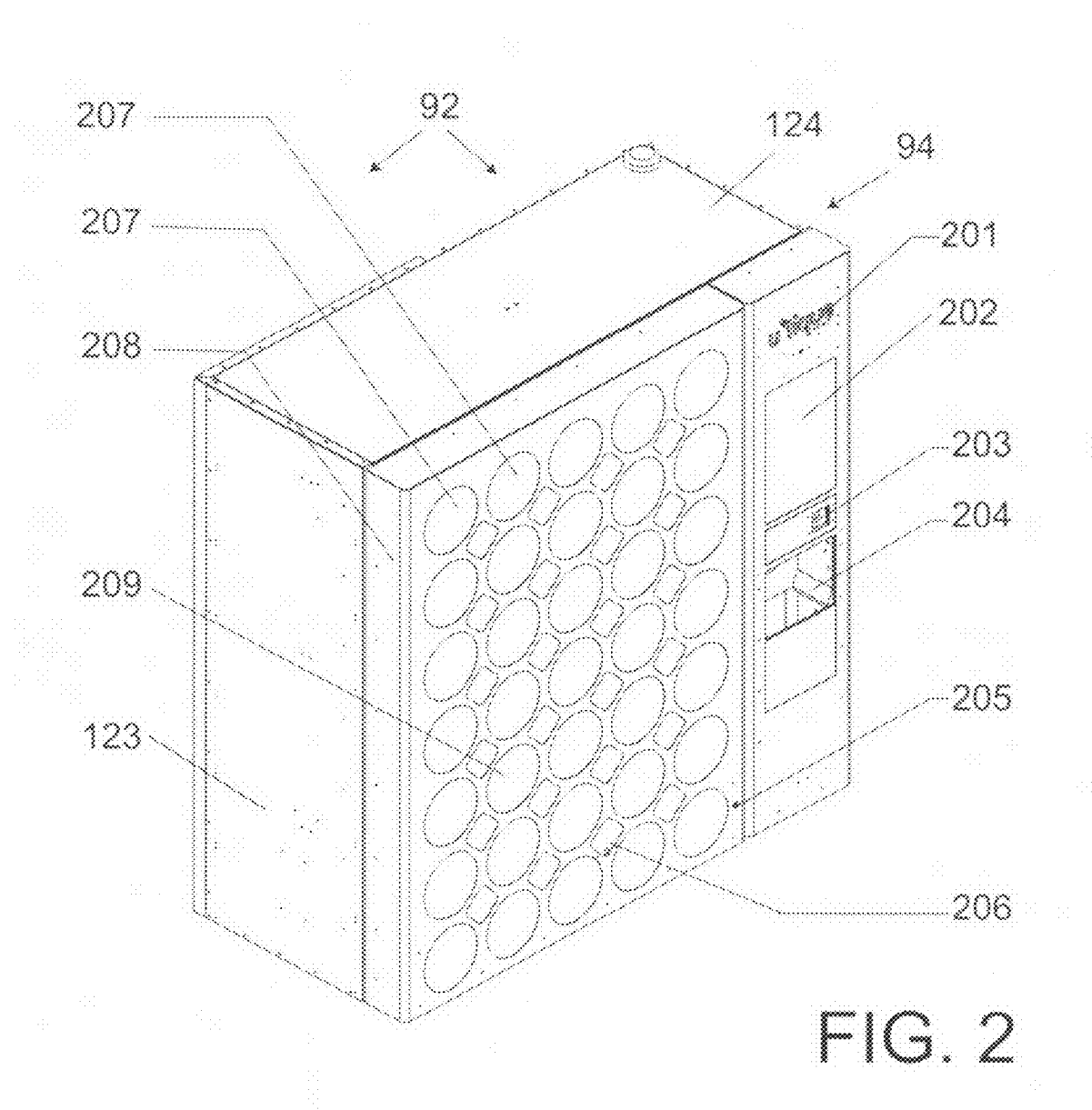
FIG. 2 is an isometric view of the assembled vending machine module of FIG. 1.
Figure 3:
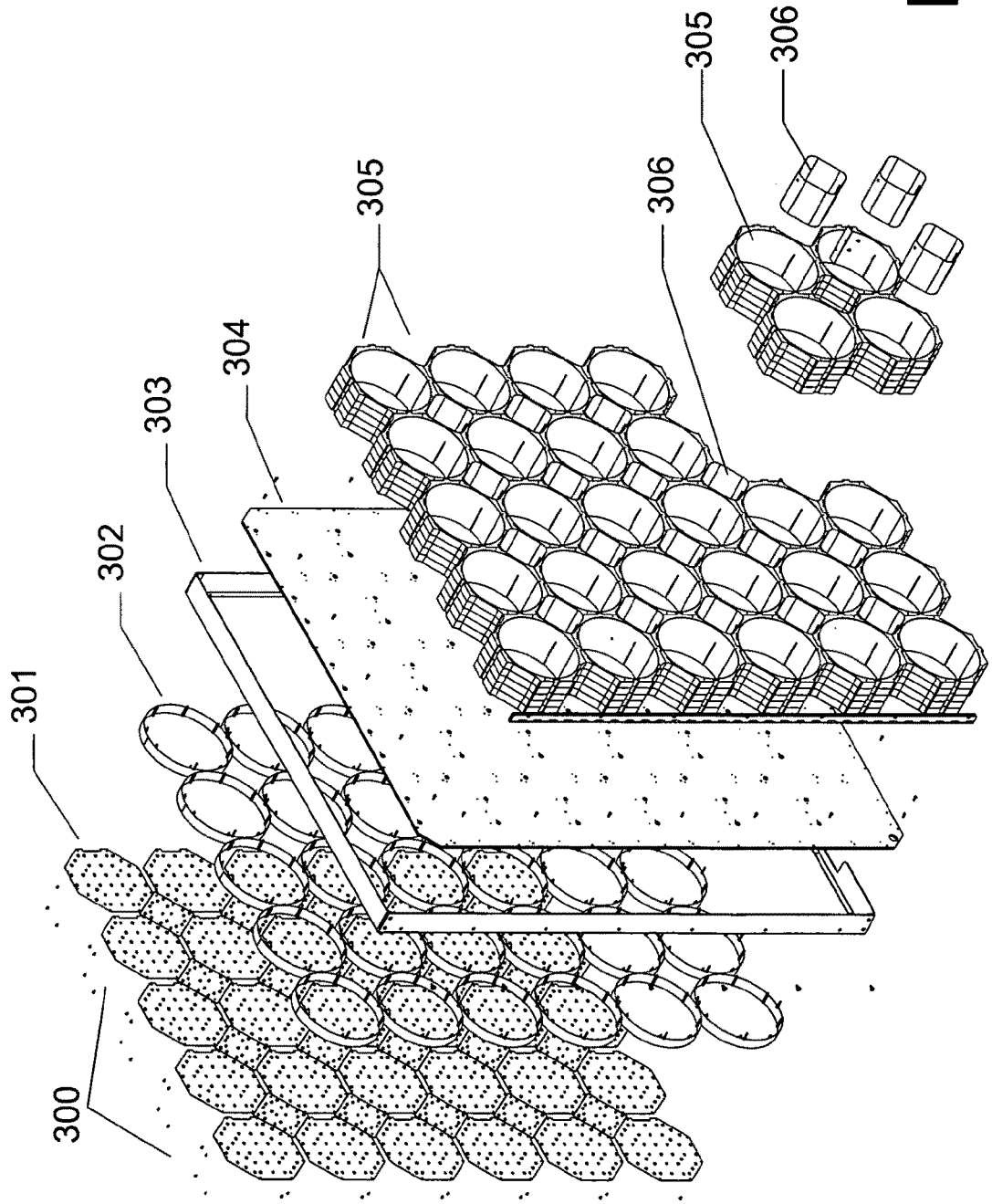
FIG. 3 is an exploded isometric view showing the preferred display case components, with portions thereof omitted for brevity or shown in section for clarity.

With initial reference directed to FIGS. 1-3 of the appended drawings, in the best mode a lighting system display module constructed in accordance with the best mode of the invention has been generally designated by the reference numeral 90. A vending machine console equipped with the instant display case lighting arrangement has been generally designated by the reference numeral 92 (FIG. 2). Lighting system 90 includes a variety of hardware and software adaptations to facilitate the various objects and advantages discussed above when integrated within a vending machine. Lighting effects are established by various circuits that control various LED-equipped circuit boards in response to software discussed hereinafter. Lighting circuit boards and components are disposed upon various product display and vending modules that are visible from the front of the vending machine 92 (FIG. 2).

A plurality of LED octagonal circuit boards 101 are arranged into geometric arrays and patterns in orderly rows and columns. Smaller, generally rectangular, secondary LED circuit boards 101A are arranged between LED boards 101. The shape of the boards 101, 101A is not critical, and they can be circular, triangular, rectangular, or other shapes, depending upon the artistic impression desired. Preferably the boards are polygonal, and in the best mode illustrated herein, they are octagonal. Boards 101, 101A are fastened within display case 103. A plurality of primary display tubes 102 arranged in an array comprising rows and columns line up with the LED circuit boards 101. The preferably, tubular plastic display tubes 102 have a generally circular cross section, into which the octagonal circuit boards 101 fit. A plurality of smaller, secondary display tubes 102A are disposed between display tubes 102 in an orderly fashion to register with rectangular LED circuit boards 101A. Display case 103 is generally rectangular, and box-like, comprising bordering sides 109, a top 110, and bottom 111, the width of which established a sufficient depth to shroud the display tubes 102 and related components.

A plurality of sensors 104 (FIG. 1) are coupled between selected display tubes 102. A plurality of preferably circular orifices 114 are defined in plate 105 to align with display tubes 102. Rectangular orifices 115 (FIG. 1) align with display tubes 102A. A plurality of smaller auxiliary orifices 117 are located about the periphery of extrusion cover mounting plate 105 for wiring.

A generally rectangular, translucent glass or plastic window 106 is secured over extrusion cover mounting plate 105. Window 106 is preferably clear and translucent for visibility. Display case 103, cover mounting plate 105 and window 106 are secured in overlying relationship within the module 90 by a rigid exterior casing 107 that shrouds the apparatus. Casing top 119 and sides 120 comprise a plurality of spaced apart mounting holes for suitable fasteners. Casing top 119 and sides 120 are attached to the display case 103 with a hinge 125 that allows access to the areas where the products are displayed.

Products featured for a vend are stored within display tubes 102 and/or 102A for illumination in accordance with the lighting scheme described in detail below. Products to be vended are stored in the rear of the vending machine 92 (FIG. 2) in a conventional fashion, and payment is received via a credit or debit transaction or alternative payment method such as a coin or dollar input accomplished with conventional coin acceptance machines and conventional vending circuitry known to those with skill in the art. Selected products are vended though conventional passageways in the vending machine to which console 92 is mated.

The illustrated embodiment includes five columns and seven rows of displays, but alternative arrays with different number of rows and columns can be used.

FIG. 2 shows the display module 90 integrated into an automated retail vending machine 92. The display module can be attached with a hinge 126 (FIG. 1) to a vending machine comprised of a rigid upright cabinet with rigid sides 123 and top 124 or mounted to a solid structure as a stand-alone retail display. The display module 90 forms a door that is hinged to the cabinet sides 123 adjacent a vertical control column 94 (FIG. 2). A variety of door configurations known in the art can be employed. For example, the display doors can be smaller or larger. Or the display doors can be located on one or both sides of the totem area. Or the display doors can have square, oval, circle, diamond, rectangular or any other geometrically shaped windows. Or the display area can have one big window with shelves inside.

A customizable, lighted logo area 201 (FIG. 2) is disposed at the top of column 94. Touch screen display 202 is located below logo area 201. Panel 203 locates the machine payment system, coin acceptor machine or the like. Additionally panel 203 can secure a receipt printer, keypad, or other access device. The product retrieval area is disposed beneath the console 92 in a conventional compartment (not shown). A key lock 205, which can be mechanical or electrical such as a punch-key lock, is disposed beneath the face of the module 90. One or more motion sensors 206 are disposed within smaller display tubes 102A within the console interior. There are a plurality of generally circular touchable product viewing areas 207 areas defined upon the outer face of the casing 208 that are aligned with internal display tubes 102 tubes previously described. Areas 207 include proximity or touch sensors described hereinafter that are used for customer selection. The generally cylindrical display areas formed between areas 207 and the display tubes 102 within the machine are internally illuminated to highlight products for vending and to provide visual effects as described hereinafter.

FIG. 3 details the configuration of the internal lights. An array 300 of LED circuit boards 301 are assembled to match the product display areas in the illustrated preferred configuration. Alternative shapes and configurations such as squares can be used. Square circuit boards and display modules can be virtually combined through software programming to make up other display shapes. A spacer 302 comprising a plurality of cylinders offsets the circuit boards 301 keep the LED lights on boards 301 a modest distance away from the generally rectangular light diffuser panel 304. A generally rectangular frame 303 secures LED boards 301, spacer 302, and the diffuser panel 304 in assembly. The diffuser panel is preferably made of translucent material (such a polycarbonate material) that blurs and blends the light. LED lights on boards 301 are designed as a combination of RGB lights (red, green, and blue) that can be illuminated in various intensities to make up all of the colors of the spectrum. The diffuser helps blend these individual lights into a consistent color across the display areas.

In FIG. 3 the display tubes 305 are similar to the plastic display tubes 102 (FIG. 1) discussed earlier. In this embodiment, a plurality of smaller display tubes 306 with a diamond-shaped cross section are positioned between alternate display tubes 305 inside the display.

Figure 4:
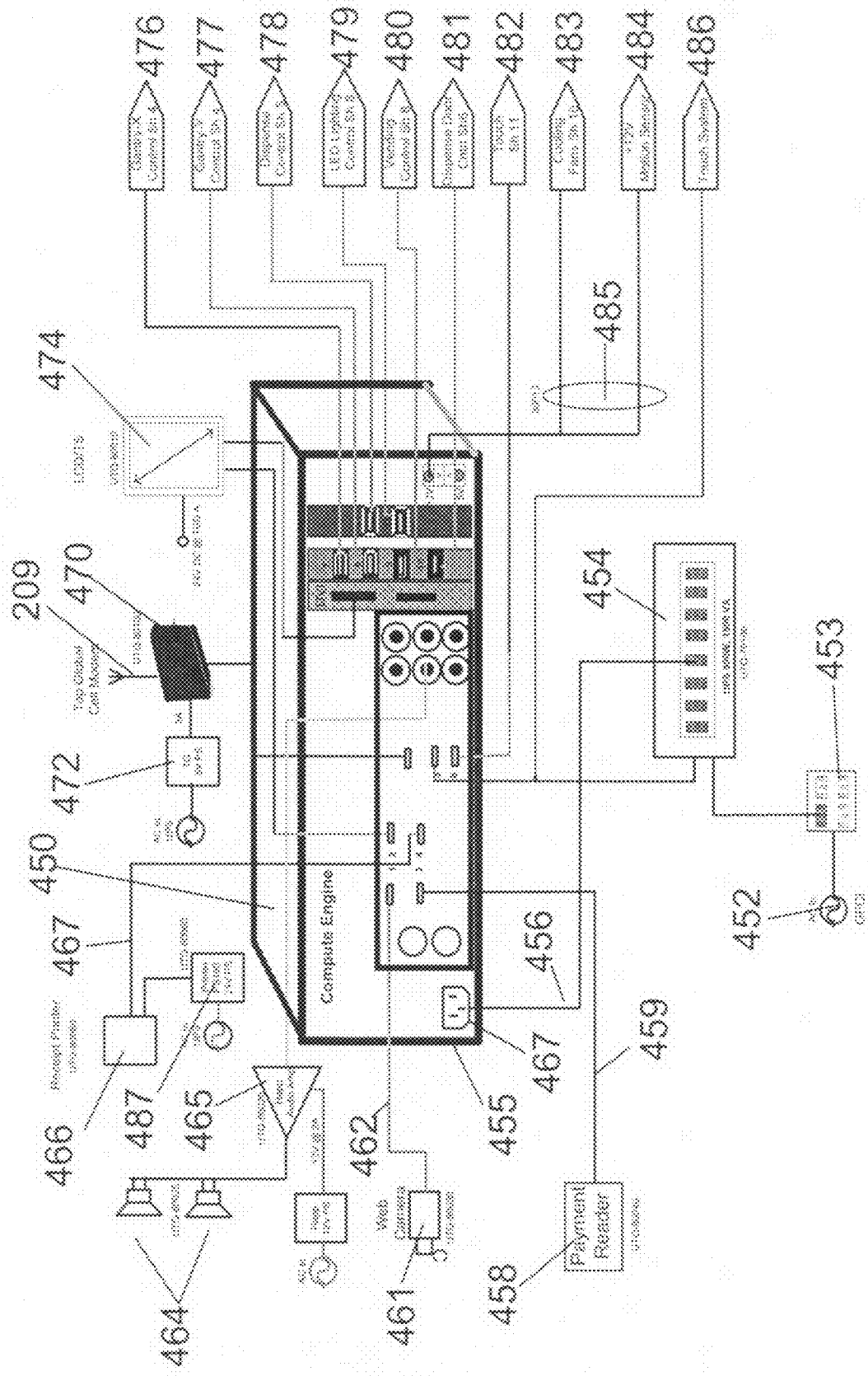
FIG. 4 is a diagrammatic view showing the preferred interconnection of the system computer and lighting control.
Figure 5:
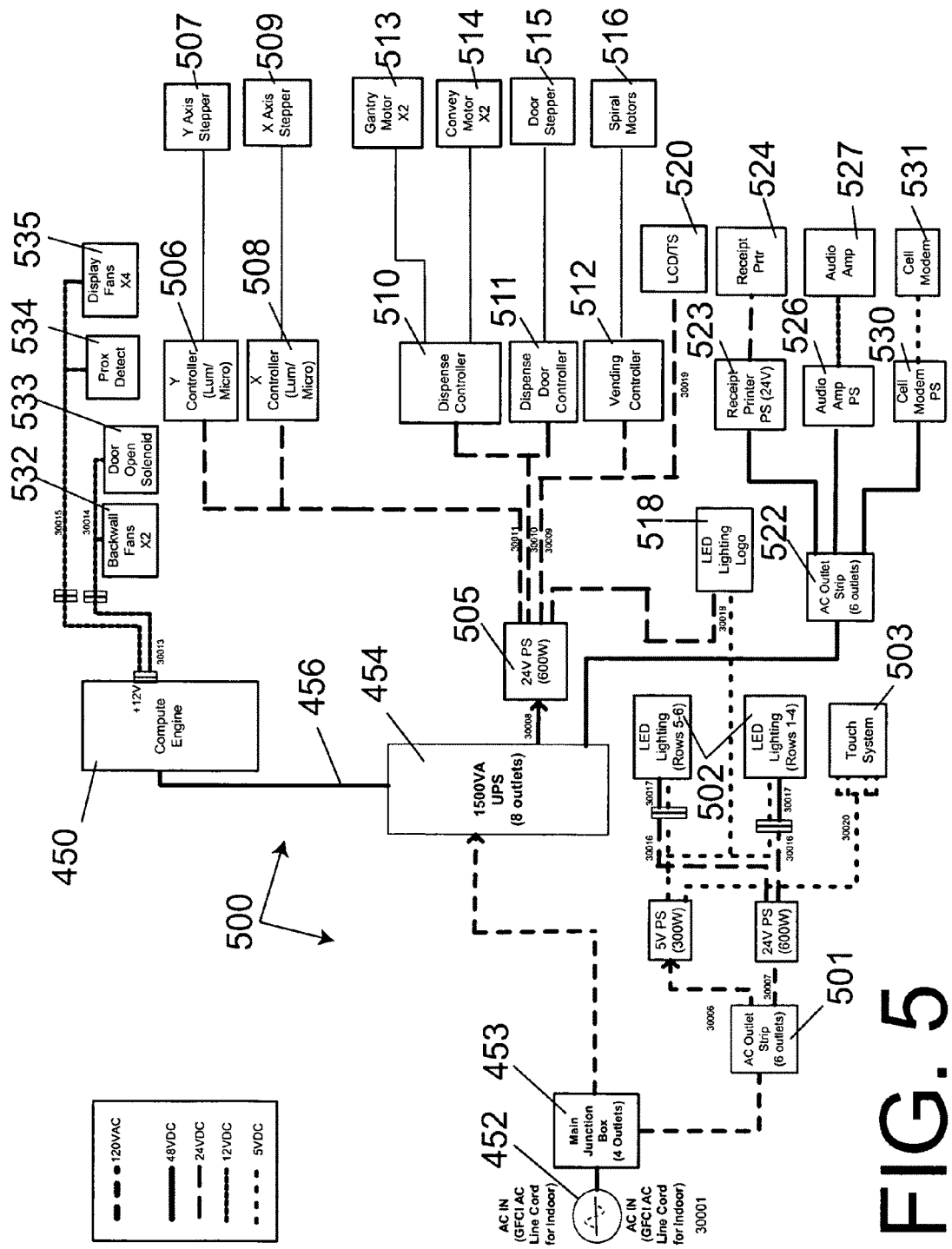
FIG. 5 is a block diagram of the preferred electrical power supply arrangement; is a fragmentary isomeric view showing the backlight system, with portions thereof omitted for clarity and brevity.

FIGS. 4 and 5 illustrate system wiring to interconnect with a computer 450 such as Advantech's compute engine with a 3 Ghz (8400) CPU, 1 GB of RAM memory, 320 GB 7200 RPM HDD, 12 USB ports, at least one Serial port, and an audio output and microphone input. The computer 450 (FIGS. 4, 5) communicates to the lighting system network controller via line 479. Through these connections, the lighting system is integrated to the rest of system. Power is supplied through a plug 452 that powers an outlet 453, which in turn powers a UPS 454 such as TripLite's UPS (900 W, 15 VA) (part number Smart1500LCD) that conditions source power, which is applied to input 455 via line 456. Power is available to accessories through outlet 453 and UPS 454.

Computer 450 (FIG. 4) is interconnected with a conventional payment reader 458 via cabling 459. An optional web-accessing camera 461 such as a LOGITECH webcam (part number 961398-0403) connects to computer 450 via cabling 462. Audio is provided by transducers 464 such as Happ Controls 4" speakers (part number 49-0228-00R) driven by audio amplifier 465 such a Happ Controls Kiosk 2-Channel Amplifier with enclosure (part number 49-5140-100) with approximately 8 Watts RMS per channel 10% THD (10 Watts RMS @ 16 v Input) and audio input of a 3.5 mm stereo jack and audio output 0.100" center locking header connector connected to computer 450. A receipt printer 466 such as Epson's EU-T300 Thermal Printer connects to the computer 450 via cabling 467. The printer is powered by a low voltage power supply such as Epson's 24 VDC power supply (partn number PS-180). A remote connection with the computer 450 is enabled by a cellular link 470 such as Multitech's Verizon CDMA cellular modem (part number MTCBA-C-IP-N3-NAM) powered by low voltage power supply 472. The cellular link 470 is connected to an exterior antenna 209. A touch enabled liquid crystal display 474 such as a Ceronix 22" Widescreen (16:10) Touch Monitor for computer operation also connects to computer 450.

Digital connections are seen on the right of FIG. 4. Gantry-X, stepper motor controller such as the Arcus Advanced Motion Driver+Controller USB/RS485 (part number Arcus ACE-SDE), and Gantry-Y stepper motor controller such as the Arcus Advanced Motion Driver+Controller USB/RS485 (part number Arcus ACE-SDE) connections are designated by the reference numerals 476 and 477 respectively. Dispenser control output is designated by the reference numeral 478. LED lighting control signals communicate through USB cabling 479 to a DMX controller 622, that transmits digital lighting control signals in the RS-485 protocol to the display tube lighting circuit board arrays. An ENTTEC-brand, model DMX USB Pro 512 I/F controller is suitable. Cabling 480 leads to vending control. Dispenser door control is effectuated via cabling 481. Touch sensor inputs arrive through interconnection 482. Cooling fans are controlled through cabling 483. Motion sensor inputs from a motion sensor such as Digi's Watchport/D (part number Watchport/D 301-1146-01) are received through connection 484. Cabling connections 483 and 484 are shielded as indicated by reference numeral 485. The touch system is connected to the computer 450 via cabling 486.

FIG. 5 illustrates a more detailed power distribution arrangement 500. Because of the various components needed in the system, power has to be converted to different voltages and currents throughout the entire system. The system is wired so that it can run from standard 110 V.A.C. power used in North America. It can be converted to run from 220 V.A.C. for deployments where necessary. Power supplied through plug 452 (FIG. 4) powers an outlet 453 (FIGS. 4, 5) that powers UPS 454 which conditions source power, which is applied to input 455 via line 456. Power is available to accessories through outlet 453 and UPS 454. An additional AC outlet strip 501 such as Triplite's six position power strip (part number TLM606NC) powers LED lighting circuits 502 and a touch system 503.

A 24V DC Power Supply Open Frame 24 VDC, 6.3 A, 150 W power supply 505 (FIG. 5) powers Y controller 506 such as the Arcus Advanced Motion Driver+Controller USB/RS485 (part number Arcus ACE-SDE), that connects to Y axis stepper 507. A suitable stepper 507 can be a Moons-brand stepper motor (part number Moons P/N 24HS5403-01N). Power supply 505 also connects to an X controller 508, which can be an Arcus-brand Advanced Motion Driver+Controller USB/RS485 (part number Arcus ACE-SDE), that connects to X axis stepper 509. A Moons-brand stepper motor (part number Moons P/N 24HS5403-01N) is suitable for stepper 509.

Power supply 505 (FIG. 5) also powers dispenser controller 510, dispenser door control 511, and vending controller 512. Controller 510 powers gantry motor 513 and two conveyor motors 514 and 515. Motors 514 and 515 can be Canon-brand DC gear motors (part number 05S026-DG16). Door stepper motor 515 can be a Canon DC gear motor (part number 05S026-DG16). Controller 512 operates spiral motors 516 such as the Vendapin Universal 24 volt DC gear motor (part number 605008-001). The logo space 201 (FIG. 2) is illuminated by lighting 518 (FIG. 6) powered by supply 505. Supply 505 also powers LCD touch screen block 520 (FIG. 6) such as a Ceronix 22" Widescreen (16:10) Touch Monitor. UPS 454 (FIG. 6) also powers an AC outlet strip 522 that in turn powers a receipt printer power supply 523 such as Epson's 24 VDC power supply (part number PS-180) that energizes receipt printer 524 such as Epson's EU-T300 Thermal Printer, an audio power supply that powers audio amplifier 527 such a Happ Controls Kiosk 2-Channel Amplifier with enclosure (part number 49-5140-100), and a low voltage cell modem power supply 530 that runs cellular modem 531 such as Multitech's Verizon CDMA cellular modem (part number MTCBA-C-IP-N3-NAM).

Figure 6:
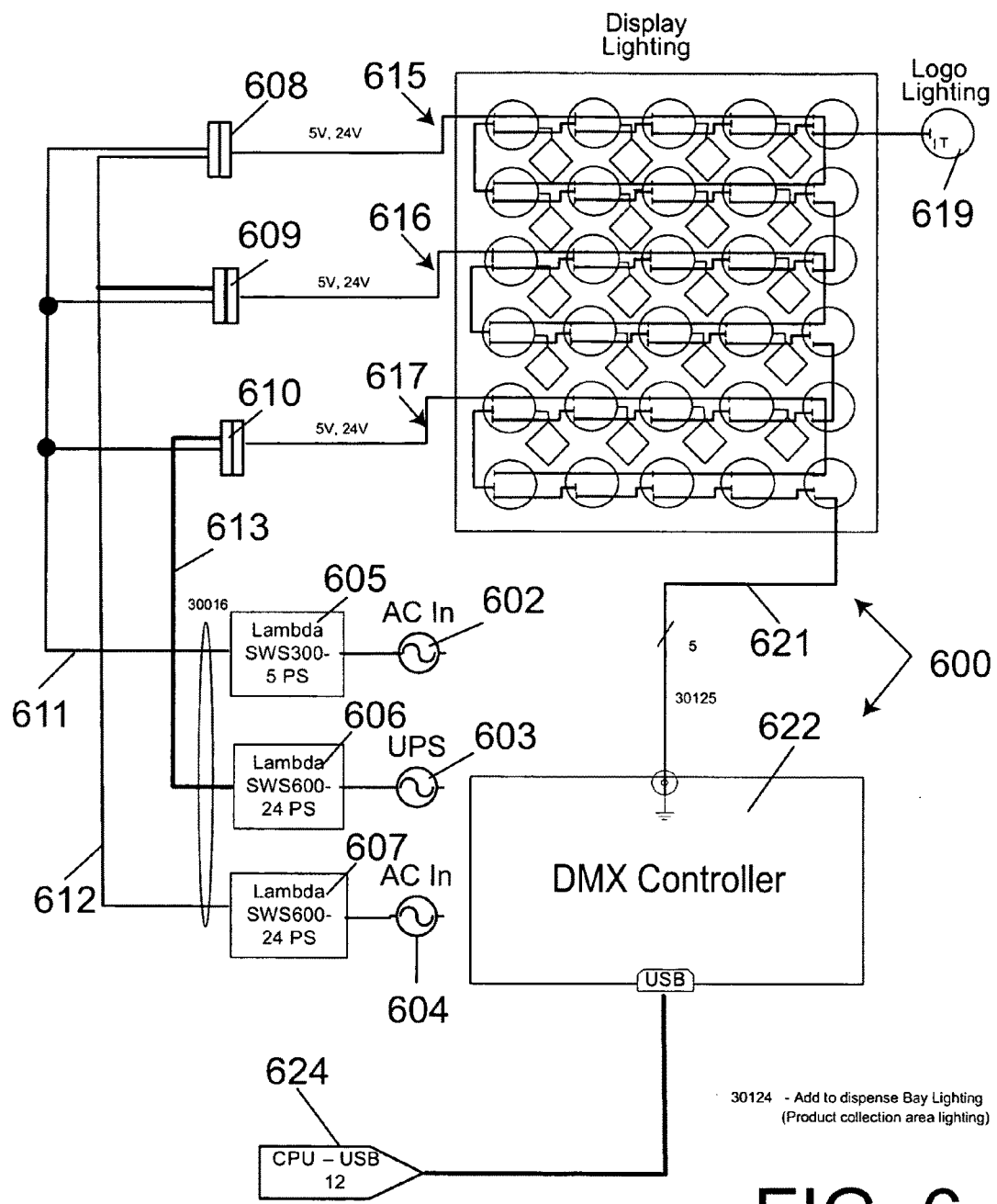
FIG. 6 is an abbreviated block diagram of the preferred lighting circuit.

Lighting wiring 600 is detailed in FIG. 6. A/C power is inputted at junctions 602, 603 and 604 that respectively power a 12V DC Power Supply 605, and two 24V DC Power Supplies 606, 607. Supply 605 comprises an Open Frame, 12.5 A, 150 W unit such as a Lambda-brand power switch, part number SWS150-12. Power switch 605 supplies 5 volt power on cable 611. Power supplies 606, 607 comprise a Lambda-brand unit, part number SWS150-24. Power switches 606 and 607 supply 24 volt power on cables 613 and 612 respectively. One five-volt power wire and two 24 volt power wires are connected on a multi-wire cable in connectors 608, 609 and 610. From there, multi-wire cables 615, 616 and 617 carry the five volt power and two 24 power wires to each LED board. The two 24 volt wires power the lights and the five volt wire is fused on the logic on the LED board 400. Items 608, 609, and 610 respectively connect to daisy-chained subarrays 615, 616, and 617 of LEDS (FIG. 6). Logo lighting at 619 is also powered by item 608.

The LED subarrays 615-617 are daisy chained and connected to DMX controller 622 for lighting effects. Controller 622 can comprise an ENTTEC-brand DMX USB Pro 512 I/F Controller. DMC controller 622 outputs digital control signals on line 621 to control the LEDs. DMX controller 622 is connected via a USB connection 624 to the computer 450 (FIG. 5). DMX controller 622 connects to the first LED board in the daisy chain. Each board is linked together in a series in this fashion with an input and an output signaling cable. There can be any number of LED boards as needed to fit the display deployment. The last LED board in the series is typically the light used for a logo or branding signage. Alternatively, this can be the first board in the series or in between two sets of LED display boards. Additional lights to illuminate an optional product collection area in a vending unit and lights to illuminate advertising signage can also be hooked up to this series of lights. Power comes from a standard alternating current outside source such as an electrical outlet. This power is converted as necessary to power the LED lights according to the LED specifications. Different types of LEDs can be used in any implementation and the power converters will change accordingly.

Figure 7:
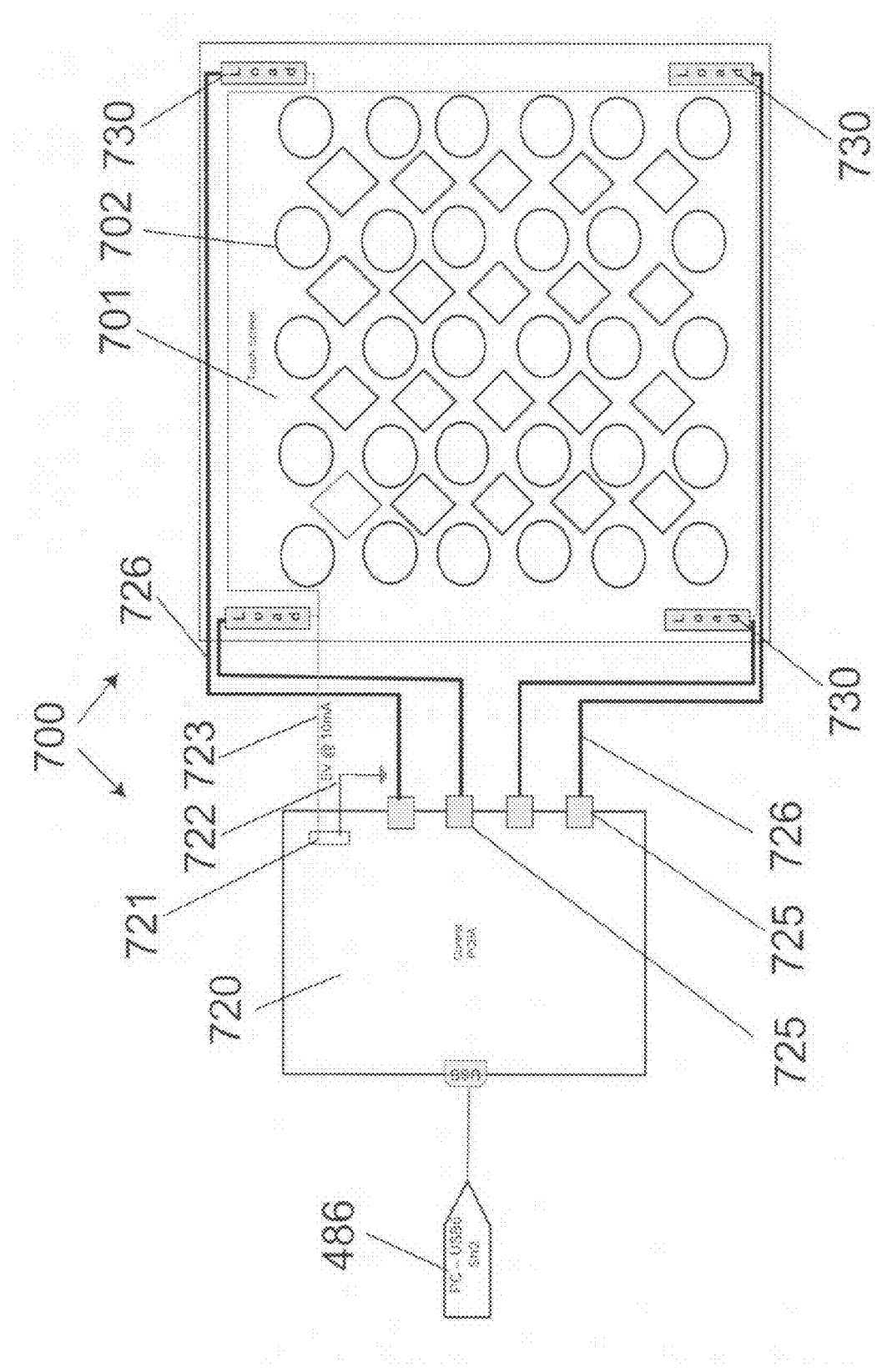
FIG. 7 is a block diagram of the preferred touch circuit.

FIG. 7 details the touch element connections. In a preferred implementation of the LED lighting system, a custom designed Printed Circuit Board Assembly (PCBA) controller 720 is used. The controller 720 has a power connection 721 that powers the PCBA logic and supplies power to the load sensors 730 over a wire 723. The sensors 730 are affixed to a transparent window 701 positioned in front of the display extrusion 702. Wires 726 connect the load sensors 730 to the controller 720 through connections 725. The four load sensors 730 each measure pressure exerted through the window surface 701 and concurrently send this data to the controller 720 that determines the location of a touch through a pressure triangulation algorithm.

Figure 8:
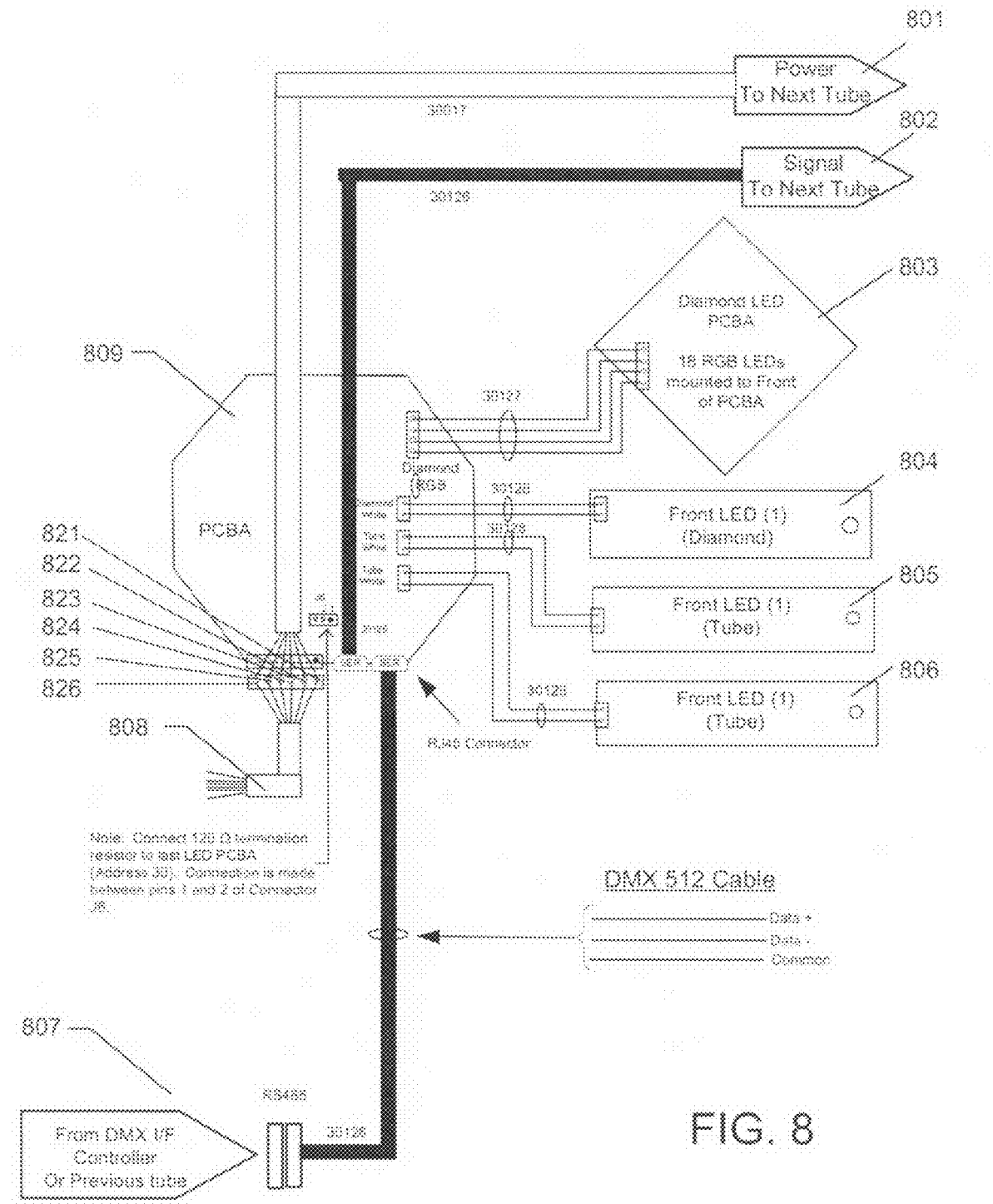
FIG. 8 is a block diagram of the preferred lighting circuit showing interconnection of a circuit board.

FIG. 8 details the lighting element connections. In a preferred implementation of the LED lighting system, each LED circuit board 809 (similar to boards 101 in FIG. 1) controls the RGB backlights on the current board, front white showcase lights such as Cree XLamp® 7090 XRE (part number L1-WN-P4-0-01) 805 and/or 806 for the current display area and the RGB backlight board 803 in a smaller display tube, and white front lights 804 such as Cree XLamp® 7090 XRE (part number L1-WN-P4-0-01) for the adjacent board. Each one of these configurations is hooked up in a daisy chain series. The board receives a communication signal from the previous board 807 and then passes that signal onto the next board at 802. The power is also passed in and out of each board 801. The address of the current board is set through a 6 wire set 808. Connected to exposed pins 821, 822, 823, 824, 825, and 826. Pin number one 821 carries 24 volts. Pin number two 822 is a ground. Pin number three 823 carries 24 volts. Pin number four 824 is a ground. Pin number five 825 is a ground. Pin number six 826 carries 5 volts and is used to power the PCBA 809. A terminator is put on the last board in the chain.

Figure 9:
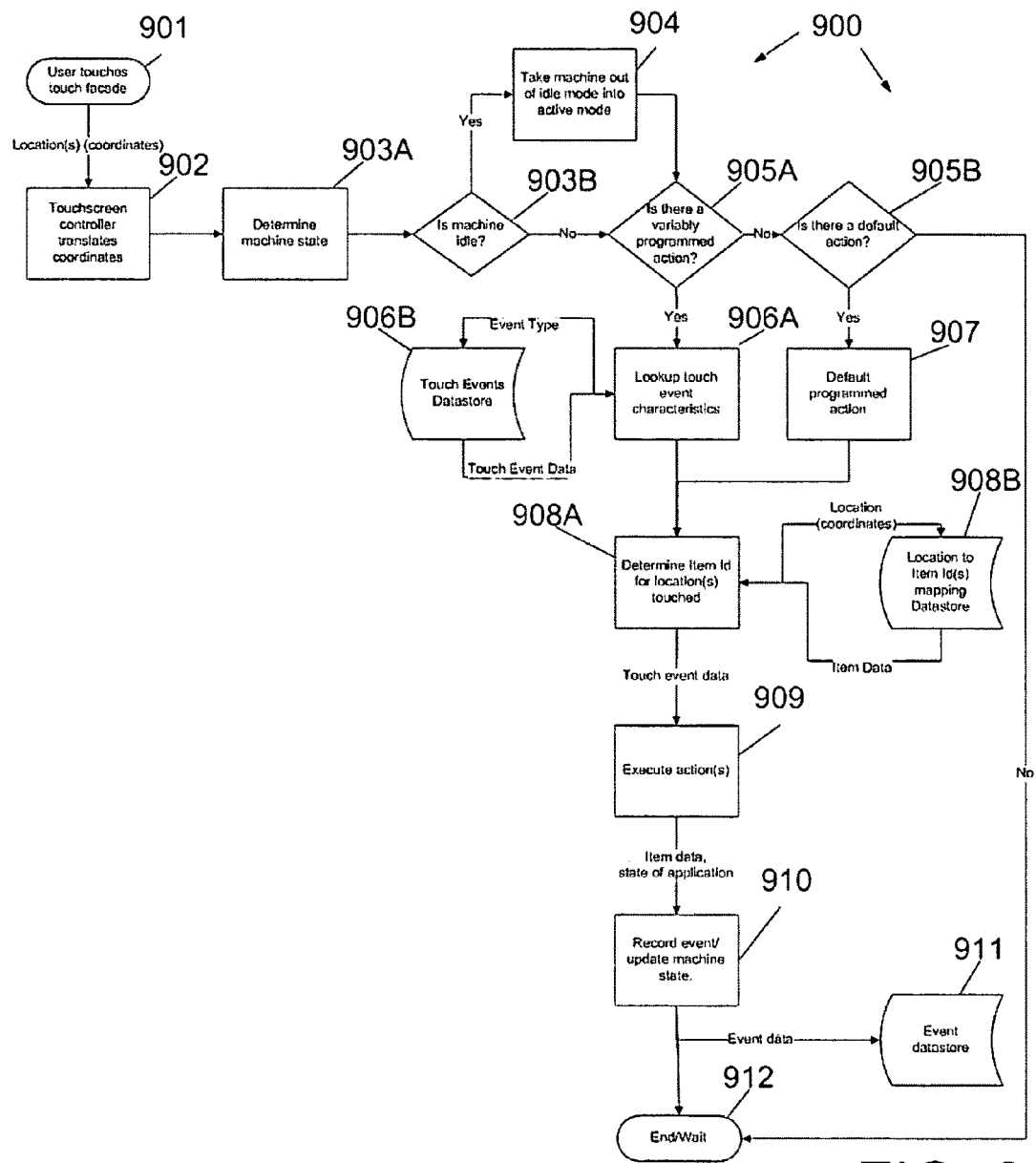
FIG. 9 is a block diagram of the preferred touch event selection software.

FIG. 9 illustrates a general software implemented touch interaction process 900. The system uses a surface 106 (FIG. 1) that is touch enabled with sensors 104 (FIG. 1)/730 (FIG. 7) to communicate with a CPU 450 (FIG. 4). These sensors 104 (FIG. 1)/730 (FIG. 7) transmit that a detectable event has occurred and transmits those coordinates to controller 720 (FIG. 7). The controller 720 (FIG. 7) converts those coordinates into signals that can be read and understood by the computer's operating system and interpreted by the software program. The software program determines which action to take.

A feature of process 900 (FIG. 9) is that actions can not only be programmed into the system, they can be customized via a data store that is accessed at runtime. Actions are only limited to what the sensors can detect. There is no limit on how many actions can be customized. Examples of detected actions could be a touch and a drag across the detectable surface or a double or multiple tap on the surface within a pre-programmed amount of time. Each of these detectable items can be grouped into a known event and acted upon by the system. As an example, a touch and drag across the surface area on the product display 106 (FIG. 1) spanning across the areas in front of multiple items in the display case can bring up detailed descriptions of all items so they can be compared on a monitor or touch screen monitor. A multiple tap on the display in front of an item can add that item to a virtual shopping bag. All of these programmable actions increase the usability of the system making it easier for a user to view and purchase items and validating their actions with a corresponding state change (lighting, audio, and/or touch screen information). There is a great advantage to having these actions customizable in a data store. This setup allows non-technical users to configure the system and change the system behavior without the need of an engineer, scientist or computer programmer. System behavior can be modified on a deployed unit remotely through the manipulation of this stored data over the Intranet via a secure connection by an authorized administrator.

There is also a data store that maps items to the physical location behind the sensor-activated display. This is set during the configuration setup and retrieved at runtime. Each item or representation of an item stored in the display contains information on what coordinates are associated with it. This information can be dynamically passed in to the touch event routine using the touch event to determine which product was selected. Configuring this mapping data does not require the software to be reprogrammed or recompiled. The software reads the data in the data field at runtime and executes according to the values stored. This has a great advantage in that non-technical people can define how the area on the façade is mapped to items in the display without the need of a trained professional such as a computer programmer or a computer scientist or computer engineer Items can be rearranged by sales and marketing people into new planograms to maximize marketability.

The process starts when a user touches a façade or gets close enough to activate the sensors in step 901. The location (s) and attributes of what was detected are translated by controller 720 (FIG. 7) based on the received input from the load sensors 730 (FIG. 7) in step 902. The application queries for the state of the machine from stored variables in step 903A. The application then determines if the machine is in an idle state in step 903B. If the machine was idle when the detected user touch was sensed by the load sensors 730 (FIG. 7) and translated to the CPU by the touch controller 720 (FIG. 7), step 904 executes a routine to take the machine out of the idle state. If the machine is not currently idle, the machine state is noted and the application determines if a customizable action was configured for the machine state and sensor input in step 905A. If there was a customized event configured, the application looks up the characteristics of that "touch event" in step 906A by executing data store step 906B. A database, flat file system, or some other data storage method can be used. If there is not a custom action defined for the current machine state and sensor input data, the application checks if there is a default action programmed in step 905B. If there is a default action programmed, the default program action is determined in step 907. If there is no action for the current machine state and data received from the touch controller 720 (FIG. 7), the process ends at step 912. If a customizable action or default action is determined, the application then determines what item(s) were detected by the sensors by looking up a mapping of the coordinates to an associated item in step 908A that triggers data store step 908B. Again, data storage step 908B can use a database, flat file system, or some other data storage method. This information is combined as the touch event data and executed by the application accordingly 909. The current state of the system is then updated and the item data and event is recorded in step 910 and stored in a data store or log file in step 911. The process then ends at step 912 and waits for other detectable actions to the touch façade from the controller 720 (FIG. 7).

Figure 10:
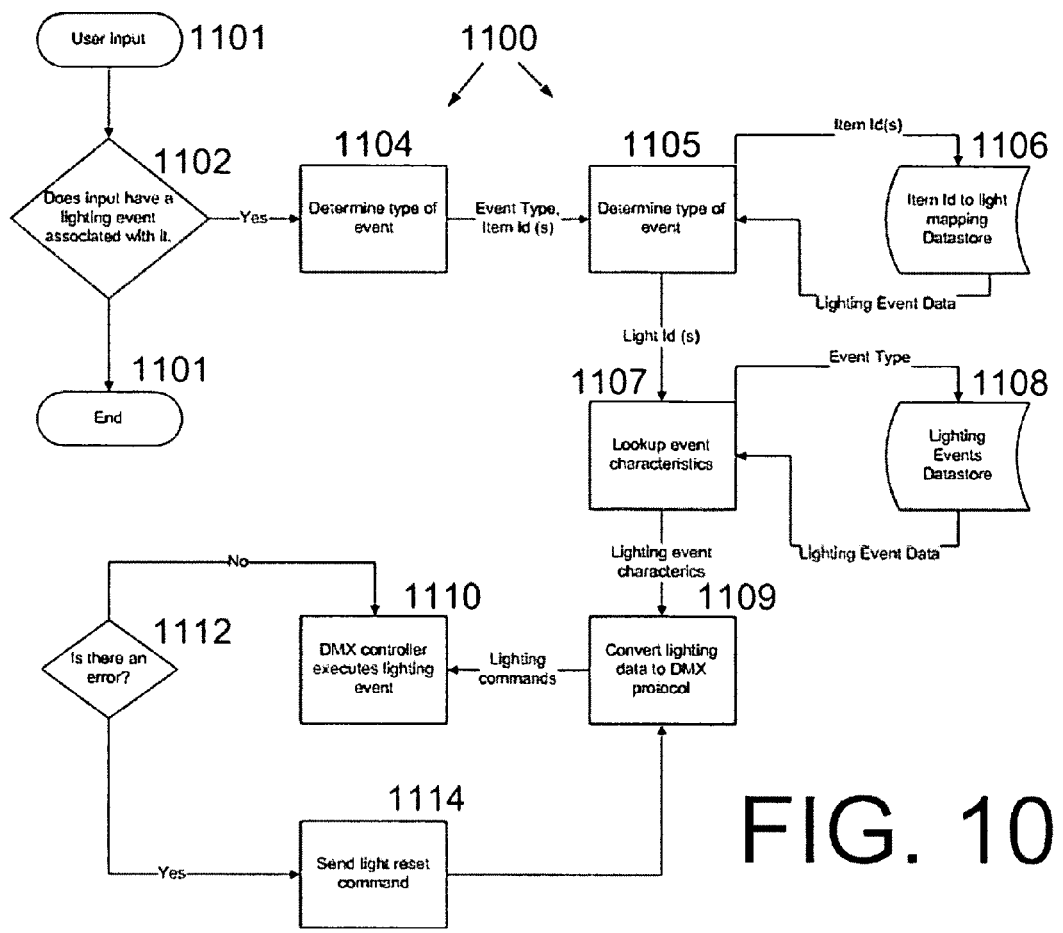
FIG. 10 is a block diagram of the preferred lighting event selection software; and, FIG. 11 is a block diagram of the preferred user or customer interaction software.

FIG. 10 illustrates a general software implemented lighting process 1100. The system uses a set of customizable lighting events that are programmed as a set of data stored in either a database or flat file storage system that are called by the software based on user interaction. User interaction determines which item(s) are to be lit. There is a data store that maps items to the physical lights. This is set during the configuration setup and called at runtime. Each lighting event contains information on which light(s) to display, color of background, intensity, fade timing, foreground lighting (showcase lighting). This information can be dynamically passed in to the lighting event routine using the lighting event data template to guide the outcome. There is no limit on the number of "events" that are stored and triggered by the software. After an event is programmed in the software, the characteristics of that lighting event can be customized through data entry. This does not require the software to be reprogrammed or recompiled. The software reads the data in the data field at runtime and executes according to the values stored. This has a great advantage in that non-technical people can define how the lighting events behave without the need of a trained professional such as a computer programmer or a computer scientist or computer engineer.

User input from either a signal from the motion detector 206 (FIG. 2), a signal from the touch screen, 202 (FIG. 2) or from a user touching the window 106 (FIG. 1) connected to the load sensors 730 (FIG. 7) that send signals to the touch controller 720 (FIG. 7) sending a signal to the CPU 450 (FIG. 4) and received by the software process step 1101 is queried at step 1102 to determine whether a lighting event has been selected. If not, the process ends at 1103, and if so, the type of event is determined in steps 1104 and 1105. An item ID and light mapping datacode are developed in step 1106. Selected lighting event characteristics are looked up and determined in step via database query step 1108. The identified lighting event is converted to the DMX protocol in step 1109. The DMX controller 622 (FIG. 6) executes the lighting event and the hardware of FIGS. 7-10 responds. If an error is determined in step 1112, a light reset command is generated in step 1114 that resets the LED board 809 (FIG. 8).

Figure 11:
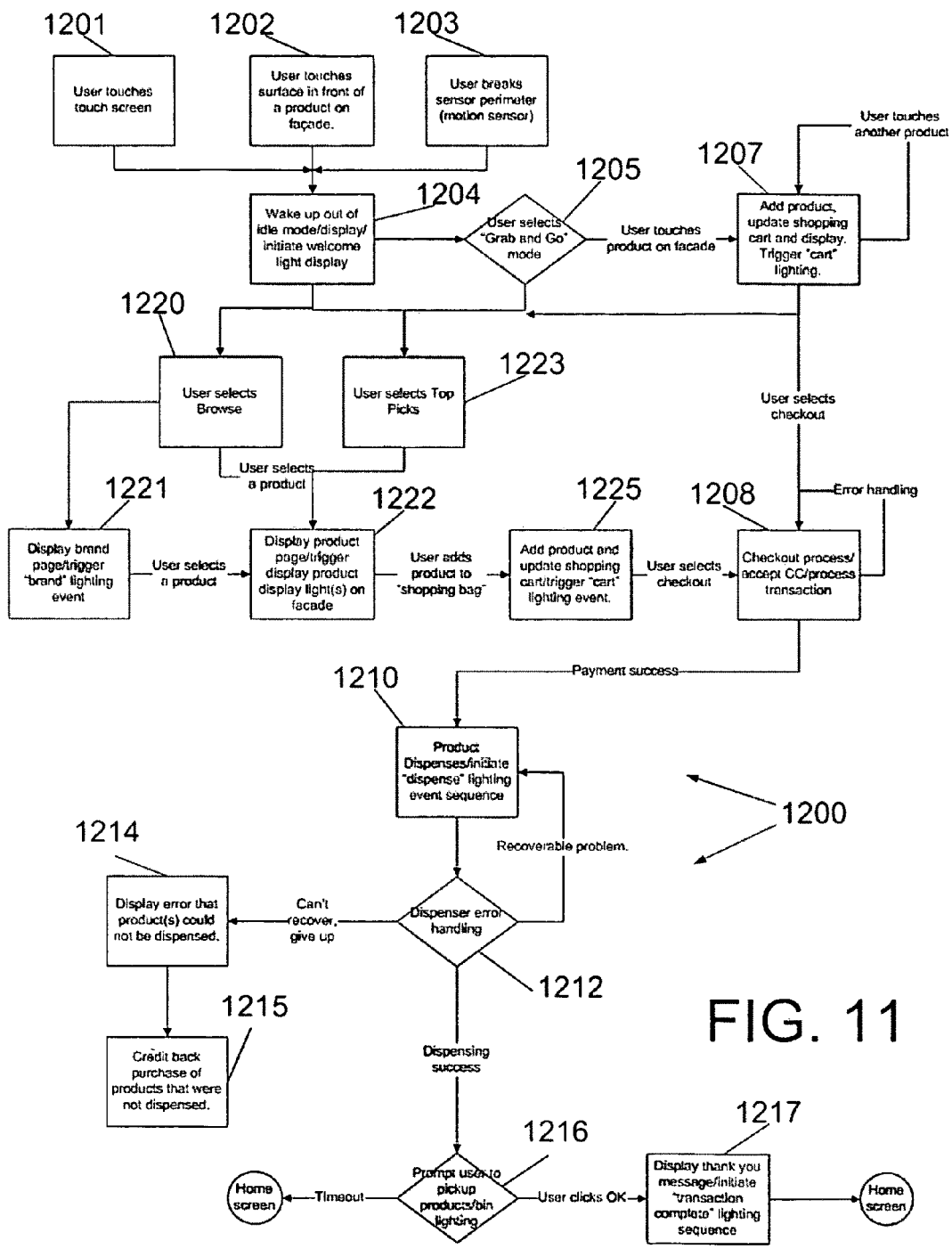

User lighting software steps are detailed in process 1200 (FIG. 11.) Program 1200 begins (after power up and initiation) with a user input. A user starts the process when they interact with the machine in a detectable way. This may be by using the touch screen 202 (FIG. 2) in step 1201, touching an activated touch sensitive façade area 207 (FIG. 2) in step 1202, or triggering a proximity sensor such as a motion sensor, magnetic field sensor or a weight sensor 206 (FIG. 2) connected to the machine in step 1203. Each of these cause an event to be recognized that was pre-programmed to use dynamic variables generated by the user and applies them to lighting rules preconfigured by an administrative user. After the user triggers the machine, they may use the touch screen 202 (FIG. 2) to browse products in step 1204, or go into a rapid shopping mode (here described as Grab and Go mode) in step 1205. When a user elects step 1205, he or she can select products in step 1207 by either touching areas in front of products on the touch sensitive display 207 (FIG. 2) or via the touch screen 202 (FIG. 2) which triggers selectively variable lighting through the previously described software and hardware. When checkout is selected, the checkout process step 1208 determines payment success by taking in input from the payment reader 203 (FIG. 2) and authorizing against an external credit authorization system, and dispensing occurs in step 1210. Errors are detected in step 1212, and if possible, corrections information is delivered for retry to step 1210. If the product cannot be vended, an error display occurs in step 1214 and the customer is credited in step 1215. If the vend occurs, the user is prompted to physically pick up the product from the collection area 204 (FIG. 2) in step 1216 and a "thank you" message is initiated by step 1217.

If users select the "browse" option in step 1220 similar products available for vending are determined in step 1221 and such similar products are illuminated via step 1222. Top picks can be selected in step 1223 and items designated as top picks in the database will be illuminated in the façade of the machine. Products are added to a "shopping cart" in step 1225, which then triggers step 1208 previously described.

Thus software process 1200 allows users to typically use the system to navigate to items/products in which they are interested and choose to add ones they wish to purchase to a virtual shopping bag. When users are navigating the products via the touch screen or the touch display, the system is programmed to recognize the current event and initiate a lighting sequence. A user viewing a product on the touch screen will have the physical product (or representation of that product) illuminate in the display case according to preset values that determine the backlight lighting color, intensity of that backlight color, fading and lighting patterns such as color transitions, blinking and other light oscillations along with the intensity of front showcase lighting that shines on the front area of a product or item. Product/item associations can also be programmed into the system. For example, the product database stores various associates a product may have such as type of product, manufacturer of product, price range, special or sales pricing. The number of associations a product might have is infinite and determined only by the administrator that sets up a given product catalog. The lighting system can be programmed to use any of these associations and light up the areas in the display façade with a related association. These lighting scenarios assist the user in finding the products they wish to purchase and may increase the number of items that are sold to that user. After the user locates the products they wish to purchase and add them to their virtual shopping bag, they can initiate the checkout sequence. The lighting system recognizes this event and will use the items the user has selected as dynamic variables that it feeds into the event profile preprogrammed for this lighting event. A common example might be that all of the items a user is purchasing are illuminated with a given color in the display area and may blink or have the color oscillate to indicate to the user what items they are purchasing. Lights may be located on the machine that guide the user to controls in which they need to interact with to complete the process. For example, a light near the payment read (e.g. a credit card reader) can be illuminated when it is time for a user to swipe and have their credit card read. This simplifies the buying process by prompting the user what they next step in the process is. Dispensing products is another recognizable event where the system can be programmed to use lighting to indicate what product is being dispensed at the current time. As products are dispensed, the lighting can be programmed to change so the user knows which items have been dispensed and which items have to be dispensed.

After items are dispensed, a collection event is launched where the collection area can be illuminated to guide the user where to retrieve their products and provide lighting so they can more easily be seen. The system resets itself to a standby lighting event after a transaction is complete. The system can also be programmed to go into an idle mode after a preset amount of time. This idle mode lighting event sequence is often used to attract users to the system where the process begins again.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A vending system for vending machines, retail displays, and automated retail stores, the system comprising:
    a lighting display module comprising:
        a rigid display case that provides a housing;
        an array of primary product display tubes disposed within the housing containing products offered for vending, the display tubes visibly associated with the display case and arranged in a geometric pattern of rows and columns;
        lighting means for selectively illuminating display tubes;
        selection sensor means associated with each product display tube for detecting customer selections;
        proximity sensor means for detecting the proximity of a customer or potential customer;
        a plurality of touchable product viewing areas, one viewing area associated with each product display tube so that a user can initiate a vend by touching a viewing area proximate a displayed product associated with a selected display tube to be selected thereby actuating said selection sensor means;
    a computer for activating and controlling the display module to respond to said selection sensor means and/or said proximity sensor means to initiate varying lighting effects in response, the computer comprising a touch screen;
    software for controlling said computer and said touch screen such that the touch screen can enable selection of a product in addition to said selection sensor means and the module can detect the presence of a customer or potential customer; and,
    means for actuating said lighting means in response to said software.

2. The vending system as defined in claim 1 wherein:
    said lighting means for selectively illuminating display tubes comprises at least one group of red, green and blue LEDs within each display tube, each group responding to a network address; and,
    said means for actuating said lighting means in response to said software comprises a network interface controller driven by said computer for activating combinations of LEDs to illuminate specific product display tubes in response to said software.

3. The vending system as defined in claim 1 wherein an LED equipped circuit board is associated with each product display tube, the circuit boards daisy chained together forming an addressable network, and each board comprising an addressable network address.

4. The vending system as defined in claim 3 wherein said network interface comprises a DMX controller for driving said network interface with digital signals for activating combinations of lights on said lighting circuit boards through said daisy chain.

5. The vending system as defined in claim 3 further comprising:
   a plurality of secondary display tubes of a smaller diameter than the primary display tubes, the secondary display tubes disposed in a regular geometric pattern between adjacent primary display tubes; and,
   means for illuminating said secondary display tubes in response to said network interface controller.

6. The vending system as defined in claim 3 wherein said software executes steps for:
   establishing a data set file storage system defining customizable lighting events, the lighting events defining selected colors, lighting intensity, and lighting fade timing;
   establishing data storage for mapping LEDs associated with each display tube;
   determining a selected item ID and corresponding light mapping datacode from said data storage step in response to a user input;
   looking up lighting characteristics in a database query for a lighting event identified in said determining step;
   converting identified lighting events to a DMX protocol; and
   activating a DMX controller to execute lighting events.

7. A vending display for vending machines, retail displays, and/or automated retail stores that comprise a supply of selectable items to be vended, the display comprising:
   a lighting display module in the form of a door coupled to a vending machine, retail display, or automated retail store, the display module comprising means for effectuating vending transactions, the display module comprising:
      a rigid display case that provides a housing;
      an array of primary product display tubes disposed within the housing containing products offered for vending, the display tubes visibly associated with the display case and arranged in a geometric pattern of orderly rows and columns;
      an array of LEDs for illuminating each primary display tube with colored light, the LEDs daisy chained together and comprising an address;
      a plurality of touchable product viewing areas, one viewing area associated with each primary product display tube;
      sensor means associated with each product viewing area for detecting customer selections;
   a computer for activating and controlling the display module to respond to said sensors and initiate varying lighting effects;
   software for controlling said computer, the software recognizing the selection of products to be vended and associating predefined lighting events with products to be vended; and,
   a DMX controller driven by said computer for addressing and activating combinations of LEDs to illuminate specific product display tubes by implementing said predefined lighting events within said primary lighting tubes associated with selected products.

8. The vending display as defined in claim 7 further comprising:
   a plurality of secondary display tubes of a smaller diameter than the primary display tubes, the secondary display tubes disposed in a regular geometric pattern between adjacent primary display tubes; and,
   a plurality of secondary LEDs of red, green and blue colors, the secondary LEDs comprising an addressable network address.

9. The vending display as defined in claim 8 wherein said software executes a user lighting routine comprising:
   a step for recognizing user input from either a touch screen, a touched product display area, or a motion or proximity sensor; and,
   steps for activating said LEDs.

10. The vending display as defined in claim 9 wherein said steps for activating said LEDs comprises steps for:
   establishing a data set file storage system defining customizable lighting events, the lighting events defining selected colors, lighting intensity, and lighting fade timing;
   establishing data storage for mapping lighting circuit boards associated with each display tube;
   determining a selected item ID and corresponding light mapping datacode from said data storage step in response to a user input;
   looking up lighting characteristics in a database query for a lighting event identified in said determining step;
   converting identified lighting events to a DMX protocol; and,
   steps for activating the network interface controller to execute the lighting event and activates particular lighting circuit boards.

11. In a vending machine comprising an upright cabinet, a supply of selectable items to be vended, a control column for customer operation of said vending machine, and means for physically discharging selected products for a vend, the improvement comprising:
   a lighting display module in the form of a door coupled to said vending machine, retail display, or automated retail store, the display module comprising means for effectuating vending transactions, the display module comprising:
      a rigid display case that provides a housing;
      an array of primary product display tubes disposed within the housing containing products offered for vending, the display tubes visibly associated with the display case and arranged in a geometric pattern of orderly rows and columns;
      LEDs illuminating each primary display tube with colored light, comprising a plurality of red, green and blue LEDs, the LEDs daisy chained together forming an addressable network with addressable network addresses;
      a plurality of touchable product viewing areas, one viewing area associated with each primary product display tube;
      selection sensor means associated with each product display tube for detecting customer selections;
      proximity sensor means for detecting the proximity of a customer or potential customer;
   a computer for activating and controlling the display module to respond to said selection sensor means and said proximity sensor means to initiate lighting effects;
   software for controlling said computer, the software recognizing the selection of products to be vended and predefined lighting events with products to be vended; and,
   a DMX controller driven by said computer for addressing and activating combinations of LEDs to illuminate specific product display tubes by implementing predefined lighting events within said primary display tubes associated with selected products.

12. The improvement as defined in claim 11 further comprising:
- means proximate said primary display tubes for diffusing light;
- white showcase lights for illuminating products contained within said primary display tubes; and,
- a touch screen for enabling customer selection of products.

13. The improvement as defined in claim 12 wherein:
the control column comprises;
- a customizable, lighted logo area;
- a touch screen for enabling customer selection of products;
- a payment system; and, said computer comprises:
- means for controlling a product dispenser; and,
- means for recognizing customer inputs.

14. The improvement as defined in claim 13 further comprising:
- a plurality of secondary display tubes of a smaller diameter than the primary display tubes, the secondary display tubes disposed in a regular geometric pattern between adjacent primary display tubes; and,
- a plurality of LEDs for illuminating said secondary display tubes in response to said DMX controller the LEDs daisy chained together and establishing an addressable network address.

15. The improvement as defined in claim 14 wherein said software executes a user lighting routine comprising:
- a step for recognizing user input from either a touch screen, a touched product display area, or a motion or proximity sensor; and,
- steps for activating said LEDs.

16. The improvement as defined in claim 15 wherein said steps for activating said LEDs comprises steps for:
- establishing a data set file storage system defining customizable lighting events, the lighting events defining selected colors, lighting intensity, and lighting fade timing;
- establishing data storage for mapping lighting circuit boards associated with each display tube;
- determining a selected item ID and corresponding light mapping datacode from said data storage step in response to a user input;
- looking up lighting characteristics in a database query for a lighting event identified in said determining step;
- converting identified lighting events to a DMX protocol;
- actuating a DMX controller to establish lighting events by activating particular LEDs.

17. The improvement as defined in claim 16 further comprising steps for activating white showcase lights for illuminating products contained within said primary display tubes.

18. The improvement as defined in claim 17 wherein:
the control column comprises;
- a customizable, lighted logo area;
- a touch screen;
- a payment system; and, said computer comprises:
- means for controlling a product dispenser; and,
- means for recognizing customer inputs.

* * * * *